(12) United States Patent
Costa

(10) Patent No.: US 7,744,355 B2
(45) Date of Patent: Jun. 29, 2010

(54) SUBMERSABLE CENTRIFUGAL MAGNETICALLY AFFIXED CURRENT CHANGING AQUARIUM PUMP

(75) Inventor: Anthony Alan Costa, Onsted, MI (US)

(73) Assignee: Sealife Aquariums Corporation, Onsted, MI (US)

( * ) Notice: Subject to any disclaimer, the term of this patent is extended or adjusted under 35 U.S.C. 154(b) by 166 days.

(21) Appl. No.: 11/935,149

(22) Filed: Nov. 5, 2007

(65) Prior Publication Data

US 2008/0107551 A1    May 8, 2008

Related U.S. Application Data

(60) Provisional application No. 60/856,812, filed on Nov. 6, 2006.

(51) Int. Cl.
F04B 35/04   (2006.01)

(52) U.S. Cl. ............ 417/423.3; 248/206.5; 210/167.21; 417/423.15

(58) Field of Classification Search ............... 417/360, 417/423.3, 420; 4/541.1; 248/430, 349.1, 248/206.5
See application file for complete search history.

(56) References Cited

U.S. PATENT DOCUMENTS

| 3,481,586 | A | 12/1969 | Roberts |
| 6,634,052 | B2 * | 10/2003 | Hanson ..................... 15/220.2 |
| 7,232,519 | B2 * | 6/2007 | Bluteau ................. 210/167.21 |
| 7,393,188 | B2 * | 7/2008 | Lawyer et al. .............. 417/420 |
| 2005/0099048 | A1 * | 5/2005 | Schneider et al. ........ 297/344.1 |
| 2006/0192062 | A1 |  8/2006 | Tunze |
| 2006/0210412 | A1 |  9/2006 | Lawyer et al. |

* cited by examiner

Primary Examiner—Devon C Kramer
Assistant Examiner—Todd D Jacobs
(74) Attorney, Agent, or Firm—Bliss McGlynn, P.C.

(57) ABSTRACT

An aquarium pump including a first unit comprising a magnet in an encasement disposed against the outside panel of an aquarium or other tank, and a second, submersible unit comprising a magnet in an encasement and a motor, an impeller, and buoyant material contained within a chamber disposed against the inside panel of an aquarium or other tank and opposing the first unit. The magnet included on the second, submersible unit includes a plurality of recesses into which are inserted synthetically coated ball bearings that are allowed rotate freely, with a portion of the ball bearings extending outside the magnet thus allowing the ball bearings to make contact with the aquarium or tank wall and allowing the second, submersible unit to be maneuvered into place without the necessity of violating the aquatic environment. The buoyant material allows the second, submersible unit to remain fixed in place solely utilizing magnetic attraction.

8 Claims, 5 Drawing Sheets

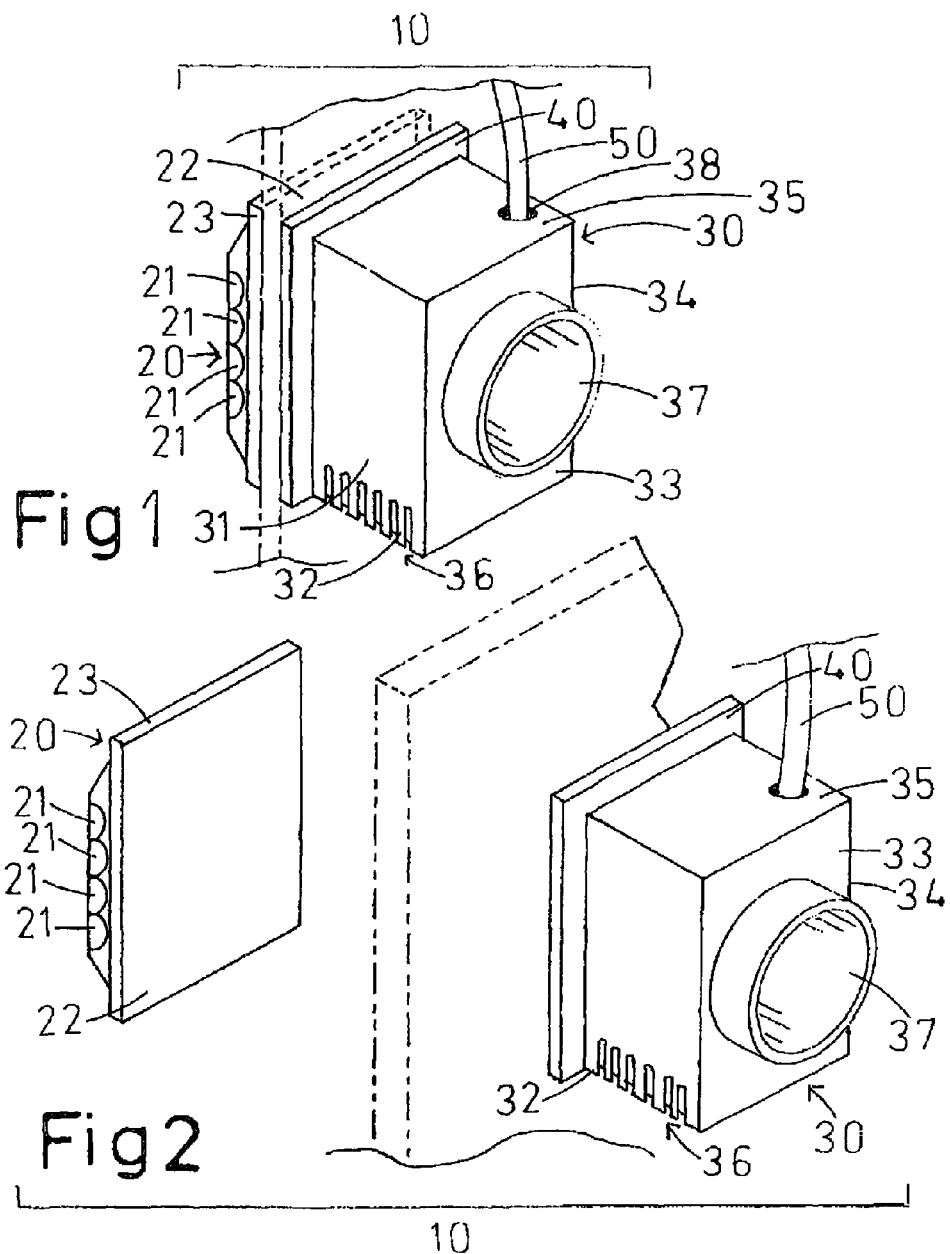

SUBMERSABLE CENTRIFUGAL MAGNETICALLY AFFIXED CURRENT CHANGING AQUARIUM PUMP

CROSS REFERENCE TO RELATED APPLICATIONS

This Application claims the benefit of Provisional Patent Application Ser. No. 60/856,812 filed Nov. 6, 2006, by the present inventor.

FEDERALLY SPONSORED RESEARCH

Not Applicable

SEQUENCE LISTING OR PROGRAM

Not Applicable

BACKGROUND OF THE INVENTION

1. Field of the Invention

The present invention relates to magnetically affixed fluid pump devices, and more specifically to a submersible aquarium pump utilizing a centrifugal design that can be easily positioned by manipulating a magnetic affixing device to affect changes in current within an aquarium.

2. Description of the Related Art

To adequately care for and maintain a vibrant closed aquatic environment, several items are fundamental. Water quality, light or simulated light, and a means of providing oxygen within the closed environment are all critical. Particularly with salt or brackish water environments, the ability to provide an alterable simulated current for distribution of oxygen and food in water columns for an extended period of time within the environment is also paramount.

In nature, aquatic environments are exposed to multiple types of water motion per day, including tidal currents, wind driven wave production, and swells. This water motion not only provides the environment with oxygen, but in environments supporting reef life, water motion encourages stronger reef growth and distribution of food to sessile life forms.

Creating realistic water movement in a closed environment poses several challenges, and to that end the prior art suggests numerous ways to address this issue. Add the concern of maintaining environmental integrity and elimination of contamination, especially important in salt and brackish environments, and the applicable field of art narrows.

To ensure proper and varied water movement, any device introduced into a closed aquatic environment must necessarily be easy to move, without the necessity of reaching into the aquarium and thus risk contaminating the environment or endangering the person reaching into the tank. Aquarium pumps that rely upon brackets or suction cups for mounting the pump are limited in mobility. To increase the ease of moving such a pump within a closed system, the prior art discloses the use of a set of magnets, one being located outside the tank and one inside the tank to which the pump may be mounted to affix an aquarium pump in place.

In U.S. Pat. No. 3,481,586 to Roberts, therein is disclosed a centrifugal aquarium pump that utilizes magnetic attraction to drive the pump. In Roberts, the pump is secured in place using a bracket that extends from the exterior of the tank into the tank itself to secure the pump to the interior surface of the aquarium wall.

In U.S. Patent Application No. 2006/0210412 to Lawyer, et al., there is disclosed a bracketless magnetic pump. In Lawyer, an impeller is located within the aquarium and is secured in place along an interior wall of the aquarium by a magnet attracted to an opposing magnet located outside the aquarium. The impeller, in turn, is driven by magnetic force.

The device in Lawyer achieves advantages over Roberts in not relying upon brackets, which provides the ability to position the pump within the environment without risking contamination to the environment. Lawyer, however, relies upon magnetic force through the pane of the aquarium to drive the impeller, which may not provide the optimum amount of power to the unit to create a current, as opposed to merely providing aeration. Further, the unit located outside the tank can be heavy and not able to be adequately supported by magnetic attraction alone, resulting in either the unit not remaining in the place, or necessitating the reliance on suction cups or brackets to hold the unit in place. This is not as significant an issue if the unit is being used for aeration purposes alone. However, placement of the pump is critical when trying to achieve simulated current.

In addition to placement of the unit, flow rate is also significant when attempting to achieve current production, as opposed to aeration. Any number of pumps exist in the prior art that are designed to provide aeration to a closed aquatic environment. However, to introduce a current into the environment to encourage healthy reef growth, a unit must be able to be easily moved into various positions without contaminating the environment, and must provide both adequate water intake and outflow from the unit and enough power to create a current.

Therefore, there is a need for an aquarium pump that can be magnetically mounted in place without reliance on additional support mechanisms such as brackets or suction cups, easily moved without the necessity of reaching into the aquarium, and capable of creating enough force to effectuate the creation of a current capable of encouraging reef growth by diffusing or dissolving oxygen into the water with no stagnant or dead spots and the provision of food throughout the aquarium, as opposed to effectuating the aeration of the environment through the introduction of larger bubbles.

BRIEF SUMMARY OF THE INVENTION

Accordingly, the present invention is a submergible aquarium pump utilizing a centrifugal design and the employment of opposing magnets on either side of an aquarium wall to hold said pump in place. A plurality of synthetically coated ball bearings are located in recesses on the surface of the magnet located inside the aquarium for enhanced placement and movement of said pump. Utilization of buoyant material inside said pump reduces the weight of the unit, thereby allowing said opposing magnets to ensure that said pump stays affixed without moving under its own weight.

An advantage of the pump of the present invention is that it utilizes buoyant material to reduce the weight of the unit and thereby eliminate the need for the use of brackets or suction cups to hold the pump in place.

A further advantage of the pump of the present invention is that an enlarged water intake structure allows for increased current production.

Yet another advantage of the pump of the present invention is that is utilizes ball bearings to ensure ease and exactness in positioning of the unit within the tank without the necessity of compromising the aquatic environment.

Other objects, features, and advantages of the present invention will become apparent from the following descriptions, taken in connection with the accompanying drawings, wherein, by way of illustration and example, an embodiment of the present invention is disclosed.

While some of the objectives of the present invention are disclosed in the prior art, none of these include all of the requirements included herein.

BRIEF DESCRIPTION OF THE DRAWINGS

FIG. 1 is a planar view of the pump of the present invention illustrated in an engaged position.

FIG. 2 is a planar view of the pump of the present invention illustrated with said magnets not engaged through a wall of an aquarium.

DETAILED DESCRIPTION OF THE PREFERRED EMBODIMENTS

Figure 3:
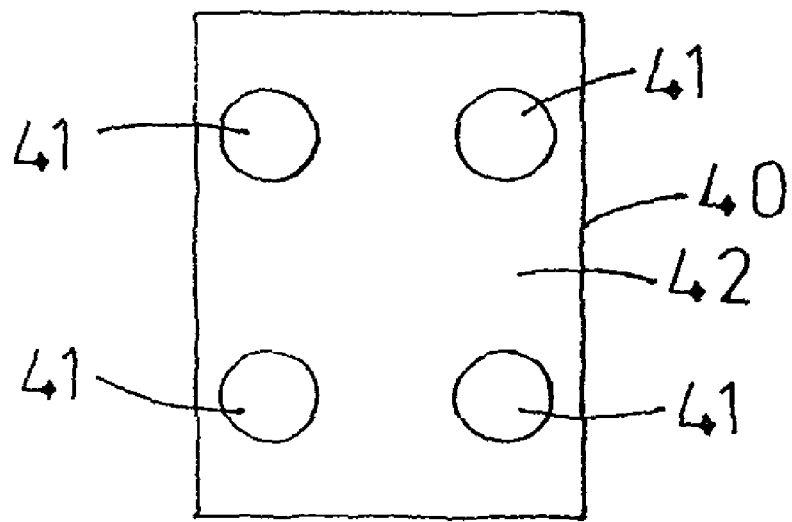
FIG. 3 is a back view of the main unit of the pump of the present invention.

Referring to the drawings contained herein, there is shown in FIG. 1 the aquarium pump of the present invention. Said pump, generally indicated at 10, includes a mounting unit disposed outside of an aquarium in contact with an aquarium sidewall, generally indicated at 20 and hereinafter referred to merely as "aquarium wall," and a submersible unit, generally indicated at 30, disposed inside of the aquarium in contact with the aquarium wall opposing said mounting unit 20. Said submersible unit is constructed of a lightweight material, such as plastic or rubber. Said mounting unit includes a casing 23 into which is secured a magnet 22. Said casing includes a series of ridges for gripping 21.

Said submersible unit, 30, is fixedly attached a housing including a first side, 31, and a second side, 34, a top side, 35, and a bottom side 32, and a front panel 33, wherein said front panel 33 includes a substantially circular tubular apparatus 37 allowing water to be forced from the inner chamber of said housing of submersible unit 30, through said substantially circular tubular apparatus 37, and into the aquarium.

In said top side 35 of said submersible unit 30 there is included a substantially circular opening for passing an electrical cord from the inner chamber of said submersible unit 30. Further, along the length of said bottom side 32 is located a plurality of slots that facilitate water intake, generally indicated at 36, that extend onto said first side 31 and said second side 34.

It will be appreciated by those having ordinary skill in the art that said mounting unit 20 and said submersible unit 30 may be of any suitable configuration that allows a magnet to be disposed against the outside wall of an aquarium, and that said submersible unit 30 may be constructed of any suitable material that is lightweight and will not rust when placed in an aquatic environment.

FIG. 2 depicts the mounting unit 20 and submersible unit 30 in an exploded view demonstrating how the two units are employed together disposed against opposite sides of an aquarium wall.

FIG. 3 depicts a back view of said submersible unit 30. Said submersible unit 30, includes an encasing 40 into which is enclosed a magnet 42. A plurality of openings, 41, are presented in said magnet, suitable for receipt of a synthetically coated ball bearing.

Figure 4:
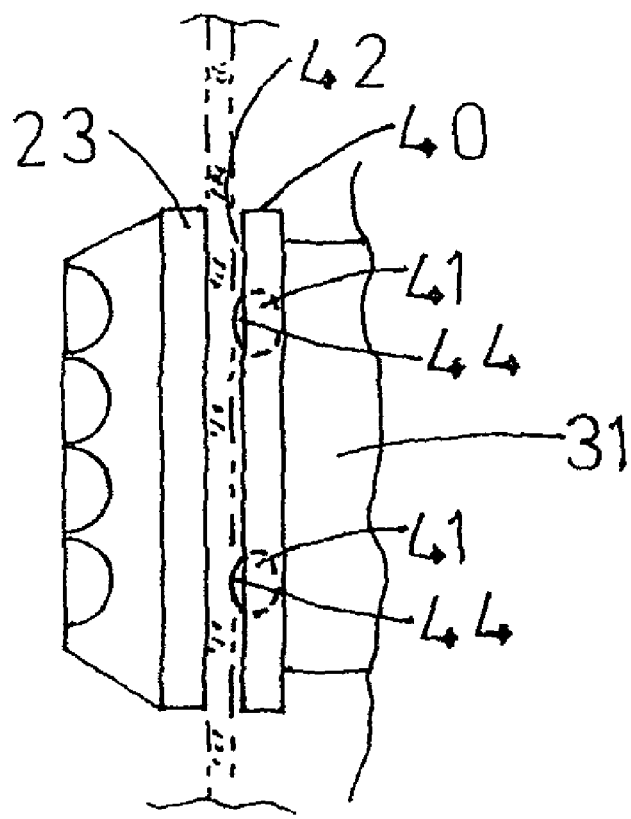
FIG. 4 is a side view of the pump of the present invention illustrated in an engaged position.

FIG. 4 depicts said mounting unit 20 and said submersible unit 30 disposed against an aquarium wall and engaged magnetically with each other. Further depicted are said plurality of synthetically coated ball bearings 44 disposed within said plurality of openings 41, leaving exposed a portion of each of said plurality of synthetically coated ball bearings 44.

Figure 5:
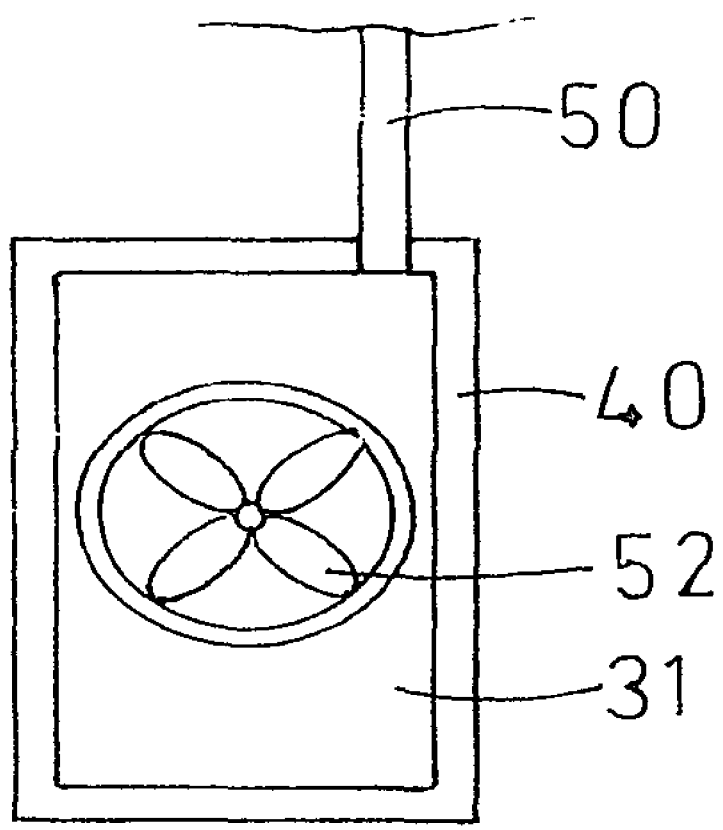
FIG. 5 is a front view of the pump of the present invention.

FIG. 5 depicts a front view of said submersible unit 30, including said front panel 33, said magnet encasing 40, an impeller 52, and an electrical cord 50 extending from within said submersible unit 30.

Figure 6:
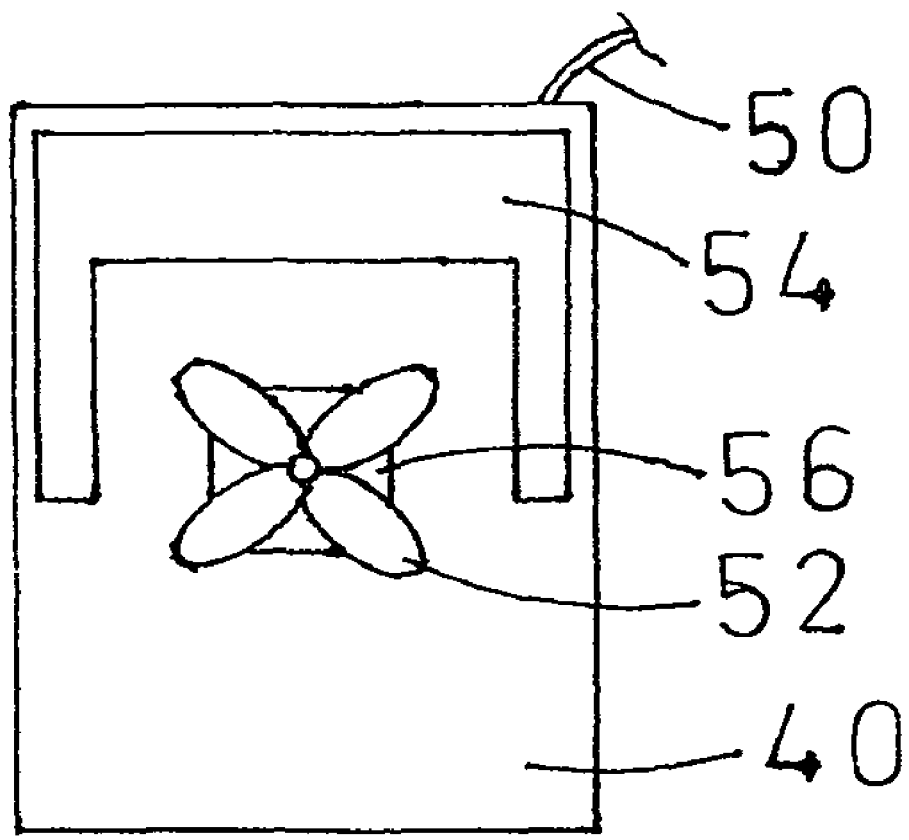
FIG. 6 is a front cut-away view of the pump of the present invention.

FIG. 6 depicts a front view of said submersible unit 30 with said front panel 33 removed, exposing the inner chamber of said submersible unit 30. Said inner chamber includes said impeller 52, a casing for a motor 56, buoyant material 54, and said electrical cord 50. Further depicted is said magnet casing 40 which serves as the back wall of said inner chamber.

Figure 7:
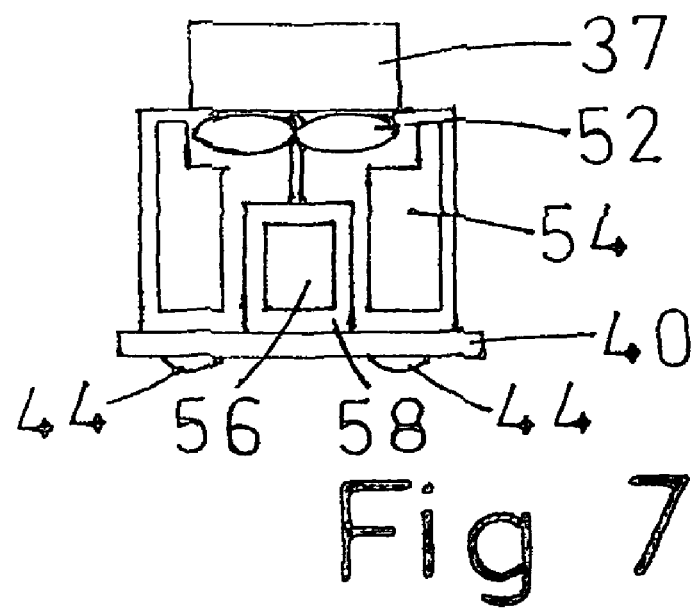
FIG. 7 is a bottom cut-away view of the main unit of the pump of the present invention.

FIG. 7 depicts said submersible unit from the bottom, with said bottom side 32 removed to expose said inner chamber of said submersible unit 30, wherein said impeller 52, motor casing 56, and buoyant material 54. Further depicted is said magnet casing 40 with said synthetically coated ball bearings 44 exposed.

Figure 8:
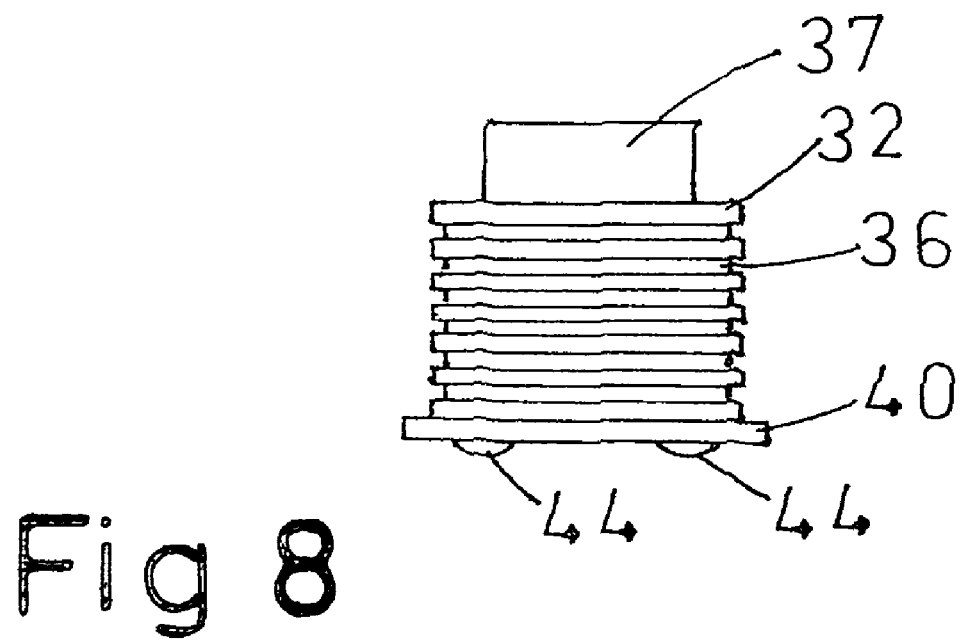
FIG. 8 is a bottom view of the main unit of the pump of the present invention.

FIG. 8 depicts a bottom view of said submersible unit 30, with said bottom panel 32 attached. Said plurality of slots 36 for water intake are depicted, as is said magnet encasing 40 with said synthetically coated ball bearings 44 exposed.

It will be appreciated by those having ordinary skill in the art that said submersible unit 30 may be of any suitable shape that permits adequate water intake and outflow of the same. Further, that said buoyant material 54 may be of any shape so as to fill a substantial portion of said inner chamber without impeding the operation of said impeller 52 or so as to restrict the flow of water into and out of said submersible unit. Additionally, it will be appreciated by those having ordinary skill in the art that said submersible unit magnet 42 and said ball bearings 44 may be of any material capable of magnetic attraction, and that said ball bearings 44 may be arranged in any manner that permits them to rotate freely while being disposed upon a pane of glass or other surface.

As can easily be seen, that a submersible centrifugal magnetically affixed current changing aquarium pump of the present invention provides an aquarium pump that may be easily maneuvered into the desired position and secured in place without the use of suction cups or brackets, and without the necessity of reaching into the aquarium and risking contamination to the environment or harm to the individual so adjusting said pump. Further, said pump provides enhanced water intake and outflow through said unit, thereby increasing the flow rate or current produced by said pump.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An aquarium pump, comprising:
   an outer member adapted so that a first side thereof may be disposed adjacent to an exterior surface of a sidewall of an aquarium or tank and including a first magnet and a first encasing supporting said first magnet;
   a submersible inner member adapted so that a first side thereof may be disposed adjacent to an interior surface of the sidewall of the aquarium or tank and opposing said outer member such that the sidewall is interposed between said inner and outer members and including a second magnet and a second encasing supporting said second magnet;

a motor-and-impeller assembly; and an attachment mechanism that uses magnetic attraction to retain said inner member and said outer member in a fixed position relative to one another, wherein said second encasing of said submersible inner member receives a plurality of ball bearings that are exposed to and disposed upon the interior surface of the sidewall of the aquarium or tank and are rotatably secured in place by said second magnet of said submersible inner member.

2. An aquarium pump as in claim 1, wherein said motor-and-impeller assembly is fixedly mounted to a second side of said submersible inner member disposed opposite the interior surface of the sidewall of the aquarium or tank.

3. An aquarium pump as in claim 2, wherein said motor-and-impeller assembly is encased in an encasement.

4. An aquarium pump as in claim 3, wherein said encasement includes a top panel, a bottom panel, a front panel, and two opposing side panels, thereby creating an inner chamber.

5. An aquarium pump as in claim 1, wherein a motor of said motor-and-impeller assembly receives power from a power cord.

6. An aquarium pump as in claim 4, wherein said bottom panel of said encasement includes a plurality of slots suitable for passing of water into and out of said inner chamber.

7. An aquarium pump as in claim 4, wherein said front panel of said encasement includes an outflow port allowing water to be forced out of said inner chamber through said outflow port by an impeller of said motor-and-impeller assembly.

8. An aquarium pump as in claim 4, wherein said inner chamber includes a buoyant material so positioned as not to interrupt flow of water into or out of said inner chamber.

* * * * *